(12) United States Patent
Mehnert et al.

(10) Patent No.: US 6,663,952 B1
(45) Date of Patent: Dec. 16, 2003

(54) STRATIFIED MATERIAL AND A METHOD FOR PRODUCING THE SAME

(75) Inventors: Reiner Mehnert, Markkleeberg (DE); Hans-Jürgen Gläsel, Leipzig (DE); Eberhard Hartmann, Priester b. Delitzsch (DE); Heinz Haller, Plochingen (DE); Bernd Schwarz, Kirchheim (DE)

(73) Assignee: WKP Wurttembergische Kunststoffplatten-Werke GmbH & Co. KG (DE)

( * ) Notice: Subject to any disclaimer, the term of this patent is extended or adjusted under 35 U.S.C. 154(b) by 0 days.

(21) Appl. No.: 09/807,028
(22) PCT Filed: Oct. 11, 1999
(86) PCT No.: PCT/EP99/07591
§ 371 (c)(1),
(2), (4) Date: Apr. 5, 2001
(87) PCT Pub. No.: WO00/22039
PCT Pub. Date: Apr. 20, 2000

(30) Foreign Application Priority Data

Oct. 9, 1998 (DE) .......................................... 198 46 659

(51) Int. Cl.⁷ ................................................. B32B 5/16
(52) U.S. Cl. ...................... 428/327; 428/331; 428/403; 428/404; 428/407
(58) Field of Search ................. 428/403, 404, 428/407, 331, 327

(56) References Cited

U.S. PATENT DOCUMENTS

| 4,218,508 | A | * | 8/1980 | Humphrey, Jr. |
| 4,478,876 | A | * | 10/1984 | Chung |
| 5,051,298 | A | * | 9/1991 | Landry et al. |
| 5,104,929 | A | * | 4/1992 | Bilkadi |
| 5,780,525 | A | | 7/1998 | Ryang et al. |
| 6,387,519 | B1 | * | 5/2002 | Anderson et al. |
| 6,467,897 | B1 | * | 10/2002 | Wu et al. |

FOREIGN PATENT DOCUMENTS

| DE | 42 13 999 | 11/1993 |
| DE | 19540623 | 5/1997 |
| EP | 0 486 469 | 5/1992 |
| WO | WO 98/51747 | 11/1998 |
| WO | WO 99/52964 | 10/1999 |

* cited by examiner

Primary Examiner—H. Thi Le
(74) Attorney, Agent, or Firm—Bachman & LaPointe, P.C.

(57) ABSTRACT

The invention relates to a stratified material with a coating which is deposited on one side or both sides and which is comprised of a planar substrate containing acrylate. The synthetic resin is modified by means of high-temperature resistant, polymerizable nanoparticles having a glass transition temperature of the homopolymerizates $\geq 150°$ C. Said nanoparticles comprise a core consisting of silicon dioxide and of at least one side chain which is covalently bound to the core via one or several oxygen atoms of the oxide, and which is of the formula $(MeO)_x(Me-(CH_2)_n-(OCO)_m-CR^1=CH_2)_y$, wherein Me represents Si or Al, x is 1 to 3, m is 0 and 1, n is 0 to 6, y is 1 to 3 and R represents H or $CH_3$, whereby the free valences of Me represent a binding to another oxygen atom of the core or are saturated by alkoxy radicals.

21 Claims, 1 Drawing Sheet

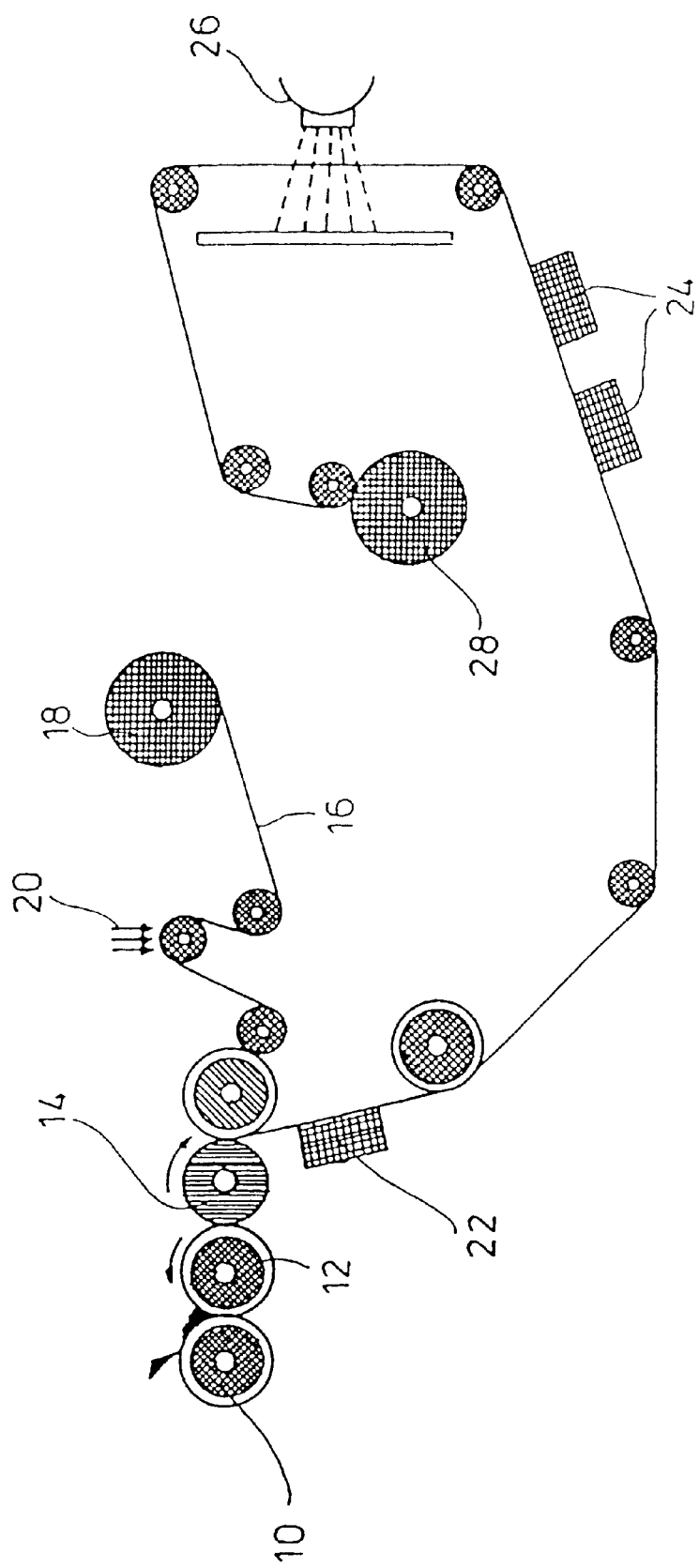

STRATIFIED MATERIAL AND A METHOD FOR PRODUCING THE SAME

The present invention concerns a laminate material, a process for the production of a coated carrier material in web or panel form, and a use of a modified synthetic resin for the surface coating of a carrier material.

Laminate materials of the general kind set forth, for example in the form of so-called decorative high-pressure molded laminated sheets or boards (DIN 16926), plastic-coated, decorative wood fiber boards or panels (DIN 68751) or plastic-coated, decorative flat pressed boards or panels in accordance with DIN 68765 are put to wide uses in everyday activities. It is precisely chipboards which are surface-coated by means of plastic material that are a preferred material in particular for the furniture industry in order in that case to manufacture products which can be loaded in terms of resistance to scratching and abrasion and which thus can be used for example as kitchen furniture. Even more severe demands in terms of resistance and loading capacity of a surface occur for example in the case of coatings for floor materials.

It is known from the state of the art for coatings of that kind, in particular in foil or sheet form for subsequent lamination to a subjacent carrier material, to be produced in the form of paper or plastic foil or sheet, which are coated with a layer consisting of a liquid acrylate and which are subsequently hardened therethrough by electron beam or UV-hardening. Even if those known layers already afford a degree of surface hardness or scratch resistance which is often already sufficient for the uses outlined, the level of scratch resistance which can be achieved in that way however is often still not adequate, in particular for surfaces of an end product, which are subjected to a severe scratching loading. In addition, for example in the case of conventionally coated chipboards, it was possible to note the detrimental effect that, when the surface coating was still hot on a panel or board coated in the described manner, they already have a tendency to suffer from scratching due to individual chipboard particles when a plurality of boards or panels are stacked one upon the other so that in this case—particularly in the case of large-scale mass production and when high production speeds are involved—the surface quality is detrimentally affected, in a manner which is visible to a customer and which therefore causes the customer concern; it is to be borne in mind that, in industrial production, a surface coating with foils or sheets is effected at web speeds above 100 m/min while coating wood carrier materials with foils or sheets coated in that way reaches speeds of up to 40 m/min.

Therefore the object of the present invention is to further develop a laminate material of the general kind set forth, in such a way that its coating is improved in terms of scratch resistance and/or resistance to abrasion, and in particular also the laminate material which is improved in that way can be produced at high production or web speeds. The invention also seeks to provide a production process for such a laminate material.

Advantageously an acrylic resin which is modified in accordance with the invention provides that the coating surface which can be achieved therewith, after radiation hardening, is markedly enhanced in comparison with the unmodified acrylate in terms of its scratch resistance when subjected to a scratching loading. That measurement in relation to scratch resistance is related to DIN 53799 with the procedure set forth therein in section 4.15 for ascertaining the characteristics involved in the case of a scratching loading.

In accordance with the invention production of the nanoparticles is effected starting from silicon dioxide in firm, finely divided form, of a particle size in the range of between 1 and 500 nm. A silicon dioxide of that kind is commercially available, for example as Aerosil® available from Degussa AG, Frankfurt, DE, or Cab-o-sil from Cabot Corp, Boston, Mass., USA.

The silicon particles have hydroxyl groups at their surface. Bonding of the side chains is effected by way of those hydroxyl groups by reaction to afford $(MeO)_x(Me-(CH_2)_n-(OCO)_m-CR^1=CH_2)_y$ and $(MeO)_xMe(CH_2)_nOCOCR^1=CH_2$, wherein Me stands for Si or Al, x ranges from 1 to 3, m stands for 0 or 1, n ranges from 0 to 6, y ranges from 1 to 3, and $R^1$ stands for H or $CH_3$, and the free valences of Me are saturated by alkoxy residues, in the presence of strong acids such as sulfuric acid, phosphoric acid, methane sulfonic acid or P-toluene sulfonic acid. In general between 1 and 10% by weight of the strong acid is used, in relation to the amount of silicon dioxide. The reaction temperature is generally between 30 and 80° C. After the reaction is concluded the strong acid is neutralised with a base. If the incorporation of $(MeO)_x$ is wanted, the reaction is conducted in the presence of the corresponding Me-alkoxy compound, for example tetramethoxysilane or Al-isopropylate.

In accordance with the invention moreover a substrate is not limited to the materials explicitly mentioned in DIN 53799, but basically in particular also papers and plastic foils or sheets (preferably in web form) are to be considered as such a substrate, which are then provided with a conventional coating thickness, in dependence on the desired purpose of use.

Any chemical compounds which are characterised by the general structures:

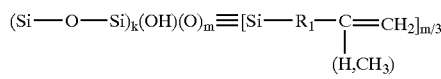

and

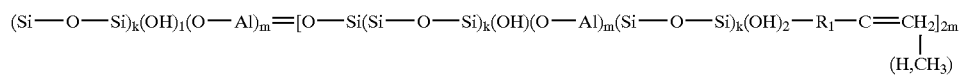

are to be taken as an acrylate which is modified by nano-scale silica, in accordance with an independent implementation of the invention, wherein $(Si-O-Si)_k(OH)_1$ are nano-scale silica particles which are bound by way of Si—O—Si and/or Si—O—Al bindings to an acrylate and/or methacrylate functionality, and wherein

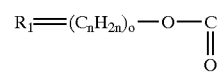

functions as a spacer group.

In addition in accordance with the invention the radiation involved is any radiation which is suitable for beam-chemical hardening of the coating material, for example electron radiation or UV-radiation, wherein the hardening kinetics are suitably set by means of otherwise known measures, in the case of using an UV-radiating device for example by the suitable addition of photoinitiators.

In a manner which is advantageous according to the invention it is consequently possible to obtain a surface coating which in comparison with the unmodified acrylate usually has values in terms of scratch resistance which are at least 50% higher, without however the coating procedures or processes which are otherwise also to be used and which are suitable for mass production having to be modified or without them being adversely affected in terms of their efficiency. On the contrary the acrylate which is used in accordance with the invention and which is modified by polymerisable nanoparticles (NKMA) makes it possible to use the liquid modified coating material in a similar manner in particular on conventional coating apparatuses practically without conversion procedures being involved so that in addition adoption of the technology in accordance with the invention, from the manufacturing point of view, is favourable and involves little complication and expenditure.

Advantageous developments of the invention are described in the appendant claims.

Thus, the surface hardness which can be achieved in respect of the polymerised coating surface which is modified in accordance with the invention, besides DIN 53799, can additionally be characterised by significantly increased hardness values in accordance with DIN 55350 or Erichsen hardness testing (test bar 318).

Plastics foils or sheets which are to be coated in accordance with the invention preferably entail layer thicknesses of between 40 and 300 μm while papers to be coated in accordance with the invention particularly preferably involve weights of between 30 and 90 g/m². Depending on the respective purpose of use involved, particularly preferred layer thicknesses of the coating applied in accordance with the invention are between 10 and 200 μm.

In accordance with a preferred development of the invention it is provided that, before the radiation hardening step, the coating surface is matted in photoinitiator-free state by UV-irradiation, in particular using wavelengths of 172 nm and 222 nm respectively. Thus it has been found to be advantageous that irradiation of the liquid modified acrylate coating with photons of the specified wavelengths (emitted by so-called excimer lamps) under inert gas produces a characteristic surface hardening and compacting effect which brings about a matting effect.

FIG. 1 is a diagram of the coating apparatus of the present invention.

Further advantages, features and details of the invention will be apparent from the description hereinafter of preferred embodiments and with reference to FIG. 1; FIG. 1 diagrammatically shows the structure of a possible coating apparatus for applying acrylates modified in accordance with the invention with additional UV-matting prior to an electron beam hardening step.

EXAMPLE 1

An NKMA-acrylate formulation is produced, in a procedure whereby 25 kg of Sartomer 494 (ethoxylated pentaerythritol tetraacrylate, manufacturer: Cray Valley, import in Germany through CRAY VALLEY Kunstharz GmbH, D-48918 Tönisvorst) is put in an agitator vessel as a prepolymer and heated to 80° C. Added thereto at that temperature with intensive agitation alternately in partial amounts in a ratio by mass of 1.4:1 are silica TT 600 (amorphous $SiO_2$-nanoparticles, Degussa) and DYNASYLAN MEMO (3-methacryloxypropyl trimethoxysilane, manufacturer: SIVENTO Chemie GmbH) until a total proportion of 7 kg of TT 600 and 5 kg of DYNASYLAN MEMO is present in the batch. Thereafter with continuing intensive agitation at 80° C. 3 kg of 97% aluminum isopropylate is quantitatively added as quickly as possible; after a further 15 minutes, that is followed by the addition of a mixture of 1.95 kg of water, 0.368 kg of 30% aqueous sodium dodecyl sulfate solution and 0.2 kg of 70% aqueous methane sulfonic acid, within a period of 0.25 hours. The mixture is then further agitated for a further hour at 80° C. and thereafter the batch is cooled as quickly as possible to ambient temperature for the coating processing operation.

The coating operation is effected on a paper web by a roller applicator process by means of a coating apparatus illustrated in the FIGURE, at a web speed of 100 m/min.

By means of a metering roller 10, an applicator roller 12 and a rubber roller 14, the NKMA-acrylate mixture is applied with an application weight of about 10 g/m² to the paper web 16 (unrolled from a supply roll 18 and subjected to preliminary preparation by corona radiation 20) and then for matting purposes it is passed either under a 172 nm excimer radiating device 22 or under a pair of 222 nm excimer radiating devices 24. Hardening of the matted coating is effected by means of an electron radiating device 26; the hardened coated substrate is then rolled on to a product roll 28.

Resistance to scratching and abrasion of the coating produced in that way is then measured in comparison with an unmodified acrylate modification, based on Sartomer 494, giving the respective values as set forth in Table 1 hereinafter:

TABLE 1

Comparison between modified acrylate (invention) and unmodified acrylate

| Testing | Product | Measured value |
| --- | --- | --- |
| DIN53799 | Sartomer 494 | 3.5N |
| (scratch loading) | Embodiment | 7.5N |
| Hardness testing | Sartomer 494 | 3.5N |
| (Erichsen 318) | Embodiment | 8.0N |

In that case measurement in terms of scratch loading is effected using the procedure set forth in DIN 53799, version of January 1986, section 4.15; the test was implemented using a hardness testing bar 318 from Erichsen GmbH & Co KG, D-58675 Hemer.

It is found in both cases that the acrylate which is modified in accordance with the invention enjoys more than twice as high values in terms of scratch resistance when subjected to a scratch loading or hardness testing than the unmodified acrylate which is known for conventional coating purposes.

Accordingly a material which is coated in the specified manner is found to be particularly suitable for the purposes of use and environments involving a high level of scratch loading, such as for example in the case of floors or worktops.

EXAMPLE 2

33.125 kg of EB 952 (UCB-Chemie Kerpen) is put in an agitator vessel and heated to 80° C. At that temperature, silica TT 600 and DYNASYLAN MEMO are added alternately in partial amounts in a relationship by mass of 2:1 until there is a total amount of 11.25 kg of TT 600 and 5.625 kg of DYNASYLAN MEMO in the batch. Thereafter, with intensive agitation at 80° C., over a period of 75 minutes, a mixture of 1.45 kg of water, 0.27 kg of SERDET solution (Eurochemie GmbH Mulheim) and 0.25 kg of 70% aqueous methane sulfonic acid is added. Agitation is continued for another 0.5 hour at 80° C. and then the methane sulfonic acid is neutralised by 15-minute dropwise addition of 150 g of 50% soda lye. Finally the batch is cooled to ambient temperature as quickly as possible.

The present invention is not limited to the above-described embodiments in terms of preparation of the coating material or the procedure involved in the coating operation. Thus in principle all previously known coating processes are also suitable for use with the acrylate which is modified in accordance with the invention and composition, chemical structure and preparation of that acrylate in accordance with the present invention includes any suitable siloxane-modified methacrylates which can be hardened by radiation-chemical means.

What is claimed is:

1. A laminate material comprising
a planar substrate having a coating applied on one or both sides and comprising a hardenable synthetic resin based on acrylate polymers,
characterised in that
the synthetic resin is solvent-free and modified by means of high-temperature-resistant polymerisable nanoparticles with a glass transition temperature of a plurality of homopolymers of $\geq 150°$ C., which have a core comprising silicon dioxide and at least one side chain which is covalently bound to the core by way of one or more oxygen atoms of the oxide and which is of the formula:

$$(MeO)_x(Me(CH_2)_n\text{—}(OCO)_m\text{—}CR^1\text{=}CH_2)_y$$

wherein
Me stands for Si or Al,
x ranges from 1 to 3,
m stands for 0 or 1,
n ranges from 0 to 6,
y ranges from 1 to 3, and
$R^1$ stands for H or $CH_3$,
wherein the free valences of Me represent a bonding to a further oxygen atom of the core or are saturated by alkoxy residues.

2. A laminate material as set forth in claim 1 characterised in that the synthetic resin is a synthetic resin which can be polymerised by radiation.

3. A laminate material as set forth in claim 1 characterised in that the synthetic resin is so modified that a polymerised surface coating is scratch-resistant at a scratch loading of up to at least 3.5 Newtons, as measured in accordance with DIN 53799 (version of January 1996, section 4.15).

4. A laminate material as set forth in claim 1 characterised in that the coating surface has a hardness of greater than 4 Newtons as measured with the hardness testing bar Erichsen Model 318.

5. A laminate material as set forth in claim 1 characterised in that the substrate is a plastic foil of a thickness in the range of between 40 and 300 µm or paper of a weight of between 30 and 90 g/m².

6. A laminate material as set forth in claim 1 characterised in that the substrate is a wood board for the production of items of furniture.

7. A laminate material as set forth in claim 1 characterised in that a layer thickness of the coating is between 10 and 200 µm.

8. A laminate material as set forth in claim 1 characterised in that the coating surface is matted to a degree of shine (60°) of less than 10, measured in accordance with DIN 67530.

9. A process for the production of a carrier material in board or web form as set forth in claim 1, comprising the steps:
preparing a solvent-free liquid synthetic resin which can be polymerised by radiation,
modifying the synthetic resin with nano-scale silica and silane,
applying the solvent-free modified synthetic resin in the form of a coating to the carrier material, and
hardening the coating, in particular by irradiation.

10. A process as set forth in claim 9 characterised in that prior to the hardening step the applied coating is irradiated with photons in the wavelength range of between 160 and 230 nm.

11. A process as set forth in claim 10 characterised in that the applied coating does not have any photoinitiators.

12. A process as set forth in claim 9 characterised in that a web speed of a continuous coating procedure is between 50 and 200 m/min.

13. The process as set forth in claim 9 wherein said solvent-free liquid synthetic resin is an acrylate.

14. A process as set forth in claim 9 characterised in that a web speed of a continuous coating procedure is between 100 and 130 m/min.

15. The process as set forth in claim 9 wherein said scratch-resistant coating comprises a laminate material.

16. A process as set forth in claim 9 characterised in that prior to the hardening step the applied coating is irradiated with photons in the wavelength range of between 172 and 222 nm.

17. Use of a modified synthetic resin as set forth in claim 1 for the surface coating of a carrier material in board or web form, wherein a polymerised solvent-free coating surface is scratch-resistant at a scratch loading of up to at least 3.5 Newtons measured in accordance with DIN 53799 (version of January 1986, Section 4.15).

18. A laminate material as set forth in claim 1 characterised in that the synthetic resin is so modified that a polymerised surface coating is scratch-resistant at a scratch loading of up to at least 4.5 Newtons as measured in accordance with DIN 53799 (version of January 1996, section 4.15).

19. Use of a modified synthetic resin as set forth in claim 1 for the surface coating of a carrier material in board or web form, wherein a polymerised solvent-free coating surface is scratch-resistant at a scratch loading of up to at least 4.5 Newtons measured in accordance with DIN 53799 (version of January 1986, Section 4.15).

20. A laminate material comprising a planar substrate having a coating which is applied on one or both sides and which comprises a synthetic resin which can be polymerised by radiation characterised in that the synthetic resin is solvent-free and is so modified by means of nano-scale silica and silane that a polymerised surface coating is scratch-resistant at a scratch loading of up to at least 3.5 Newtons, as measured in accordance with DIN 53799 (version of January 1986, section 4.15).

21. A laminate material comprising a planar substrate having a coating which is applied on one or both sides and which comprises a synthetic resin which can be polymerised by radiation characterised in that the synthetic resin is solvent-free and is so modified by means of nano-scale silica and silane that a polymerised surface coating is scratch-resistant at a scratch loading of up to at least 4.5 Newtons as measured in accordance with DIN 53799 (version of January 1986, section 4.15).

* * * * *